United States Patent
Mittal et al.

(10) Patent No.: US 11,113,839 B2
(45) Date of Patent: Sep. 7, 2021

(54) METHOD, APPARATUS, AND SYSTEM FOR FEATURE POINT DETECTION

(71) Applicant: HERE GLOBAL B.V., Eindhoven (NL)

(72) Inventors: Anish Mittal, San Francisco, CA (US); Zhanwei Chen, Richmond, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/286,265

(22) Filed: Feb. 26, 2019

(65) Prior Publication Data

US 2020/0273201 A1   Aug. 27, 2020

(51) Int. Cl.
*G06K 9/50* (2006.01)
*G06T 7/73* (2017.01)

(52) U.S. Cl.
CPC ...... *G06T 7/73* (2017.01); *G06T 2207/20021* (2013.01); *G06T 2207/20084* (2013.01)

(58) Field of Classification Search
CPC ............ G06T 7/73; G06T 2207/20021; G06T 2207/20084
USPC .................. 382/201, 164, 157, 224
See application file for complete search history.

(56) References Cited

U.S. PATENT DOCUMENTS

| | | | |
|---|---|---|---|
| 8,111,919 B2* | 2/2012 | Sullender | G06K 9/4638 382/180 |
| 8,249,348 B2* | 8/2012 | Sullender | G06T 7/11 382/180 |
| 8,280,167 B2* | 10/2012 | Sullender | G06T 7/11 382/180 |
| 8,340,421 B2* | 12/2012 | Sullender | G06K 9/4638 382/173 |
| 8,811,731 B2* | 8/2014 | Sullender | G06K 9/342 382/164 |
| 9,111,919 B2* | 8/2015 | Lichtenwalner | H01L 29/4925 |
| 9,483,701 B1* | 11/2016 | Kwatra | G06K 9/468 |
| 9,760,806 B1* | 9/2017 | Ning | G06N 3/0454 |
| 9,852,543 B2* | 12/2017 | Hare | G06K 9/00912 |
| 10,061,999 B1* | 8/2018 | Kwatra | G06K 9/00771 |
| 10,198,859 B2* | 2/2019 | Hare | G06K 9/00201 |
| 10,289,932 B2* | 5/2019 | Barnett | G06K 9/3241 |
| 10,346,464 B2* | 7/2019 | Ye | G06F 16/5838 |
| 10,361,802 B1* | 7/2019 | Hoffberg-Borghesani | G11B 27/11 |
| 10,460,033 B2* | 10/2019 | Cohen | G06N 3/0454 |

(Continued)

OTHER PUBLICATIONS

Lu et al., "G-CNN: Object Detection via Grid Convolutional Neural Network", published Nov. 7, 2017, vol. 5, pp. 24023-24031.

(Continued)

*Primary Examiner* — Marceau Milord
(74) *Attorney, Agent, or Firm* — Ditthavong, Steiner & Mlotkowski

(57) ABSTRACT

An approach is provided for feature point detection and representation. The approach, for example, involves processing (e.g., using a neural network or equivalent) image data associated with a grid cell of an image to determine a feature point corresponding to a position of a feature detected in the image data. The approach also involves encoding the position of the feature with respect to a coordinate system referenced to the grid cell. The output comprises one or more parameters indicating the encoded position, one or more attributes of the feature, or a combination thereof.

20 Claims, 12 Drawing Sheets

(56) References Cited

U.S. PATENT DOCUMENTS

| | | | |
|---|---|---|---|
| 10,497,173 B2* | 12/2019 | Fuetterling | G06T 7/20 |
| 10,515,480 B1* | 12/2019 | Hare | G06T 17/20 |
| 10,535,006 B2* | 1/2020 | Kwant | G06N 3/08 |
| 10,614,326 B2* | 4/2020 | Fung | G06K 9/00825 |
| 10,755,115 B2* | 8/2020 | Avidan | G06K 9/00805 |
| 2005/0175243 A1 | 8/2005 | Luo et al. | |
| 2009/0055205 A1* | 2/2009 | Nguyen | G06K 9/00771 463/29 |
| 2009/0196505 A1* | 8/2009 | Sullender | G06K 9/4638 382/180 |
| 2010/0014755 A1 | 1/2010 | Wilson | |
| 2010/0034466 A1* | 2/2010 | Jing | G06F 16/50 382/195 |
| 2014/0372442 A1* | 12/2014 | Cilibrasi | G06K 9/6224 707/737 |
| 2015/0106311 A1* | 4/2015 | Birdwell | G06N 3/02 706/20 |
| 2016/0284123 A1* | 9/2016 | Hare | G06T 17/20 |
| 2017/0115837 A1* | 4/2017 | Drouin | G06F 3/0482 |
| 2017/0287006 A1* | 10/2017 | Azmoodeh | H04M 15/8033 |
| 2018/0075651 A1* | 3/2018 | Hare | G06K 9/00201 |
| 2018/0285659 A1 | 10/2018 | Kwant et al. | |
| 2018/0300564 A1 | 10/2018 | Kwant et al. | |
| 2019/0213212 A1* | 7/2019 | Adato | G06T 7/13 |
| 2019/0228318 A1* | 7/2019 | Kwant | G06N 5/022 |
| 2019/0236531 A1* | 8/2019 | Adato | G06Q 10/087 |
| 2019/0258878 A1* | 8/2019 | Koivisto | G05D 1/00 |
| 2020/0143561 A1* | 5/2020 | Hallett | G06K 9/6201 |
| 2020/0226762 A1* | 7/2020 | Milovanovic | G06T 7/13 |

OTHER PUBLICATIONS

Gao et al., "Local Tiled Deep Networks for Recognition of Vehicle Make and Model", Article, Published online Feb. 11, 2016, Sensors (Basel) 16, 226, pp. 1-13.

Agarwal et al., "Facial Key Points Detection using Deep Convolutional Neural Network—NaimishNet", Oct. 3, 2017, pp. 1-7.

Chen et al., "Cascaded Pyramid Network for Multi-Person Pose Estimation", Apr. 8, 2018, pp. 1-10.

Office Action for related European Patent Application No. 20159306. 8-1207, dated Jul. 7, 2020, 12 pages.

Xingli et al., "Object recognition and simultaneous indoor location algorithm with stereo camera", Published in: 2018 5th IEEE International Conference on Cloud Computing and Intelligence Systems (CCIS), Mar. 2018, 6 pages.

* cited by examiner

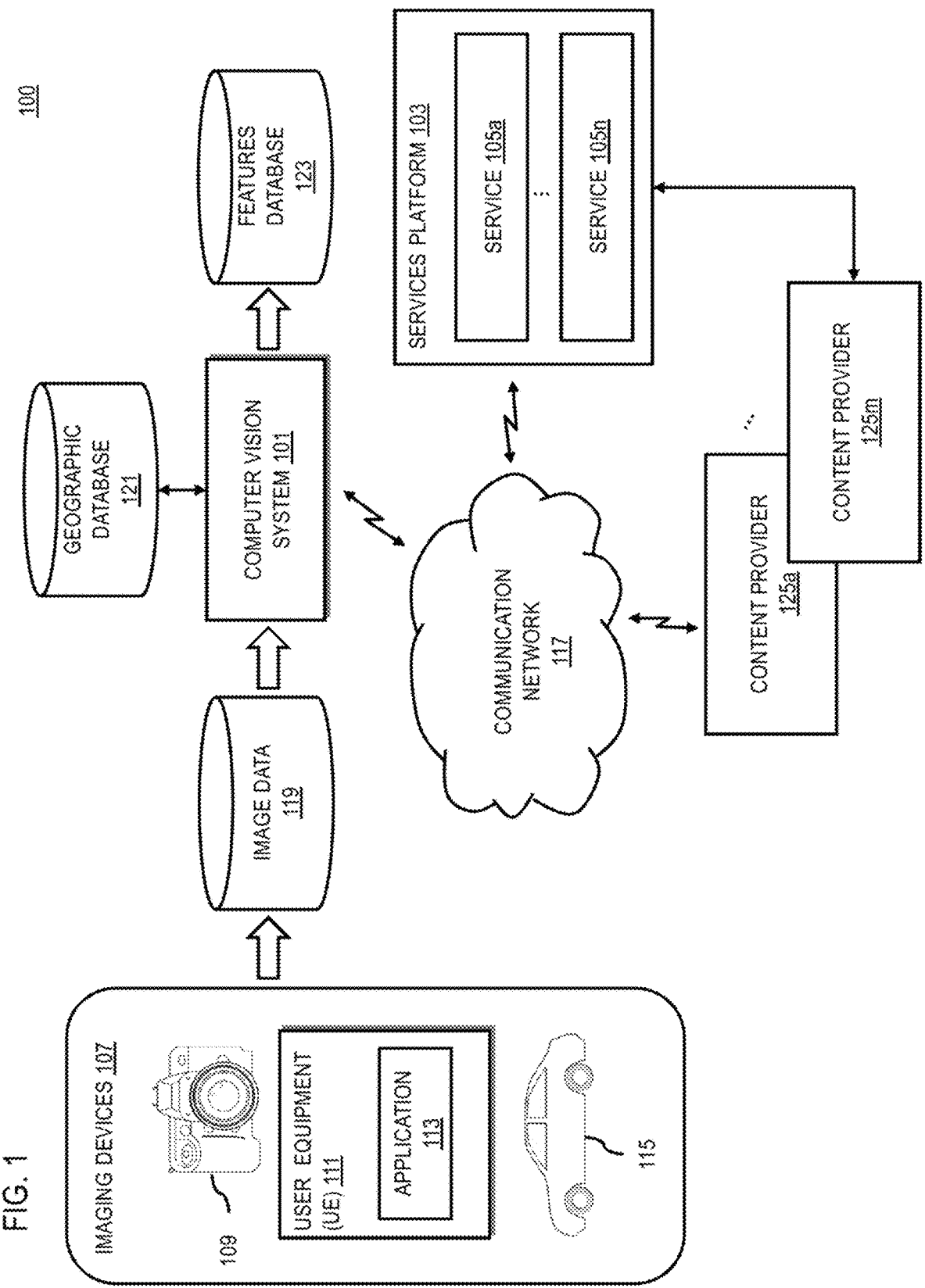

METHOD, APPARATUS, AND SYSTEM FOR FEATURE POINT DETECTION

BACKGROUND

Advances in available computing power have enabled service providers to use computer vision across a growing number of applications and domains. For example, these domains can include but are not limited to navigation/mapping, facial recognition, motion tracking, and/or any other use cases where detecting relevant features (e.g., road features, facial features, etc.) in images can form the basis of a wide range of services. However, using computer vision to perform feature detection historically has been customized to each domain or field of use, resulting in service providers having to maintain domain-specific feature detectors. Consequently, service providers face significant technical challenges to providing cross-domain feature point detection.

SOME EXAMPLE EMBODIMENTS

Therefore, there is a need for an approach for providing feature point detection that can be applied across multiple domains.

According to one embodiment, a method comprises processing (e.g., by a neural network of a computer vision system or equivalent) image data associated with a grid cell of an image to determine a feature point corresponding to a position of a feature detected in the image data. The method also comprises encoding the position of the feature with respect to a coordinate system referenced to the grid cell. The method further comprises providing an output to represent the feature point. The output, for instance, includes one or more parameters indicating the encoded position, one or more attributes of the feature, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process (e.g., by a neural network of a computer vision system or equivalent) image data associated with a grid cell of an image to determine a feature point corresponding to a position of a feature detected in the image data. The apparatus is also caused to encode the position of the feature with respect to a coordinate system referenced to the grid cell. The apparatus is further caused to provide an output to represent the feature point. The output, for instance, includes one or more parameters indicating the encoded position, one or more attributes of the feature, or a combination thereof.

According to another embodiment, a non-transitory computer-readable storage medium carries one or more sequences of one or more instructions which, when executed by one or more processors, cause, at least in part, an apparatus to process (e.g., by a neural network of a computer vision system or equivalent) image data associated with a grid cell of an image to determine a feature point corresponding to a position of a feature detected in the image data. The apparatus is also caused to encode the position of the feature with respect to a coordinate system referenced to the grid cell. The apparatus is further caused to provide an output to represent the feature point. The output, for instance, includes one or more parameters indicating the encoded position, one or more attributes of the feature, or a combination thereof.

According to another embodiment, an apparatus comprises means for processing (e.g., by a neural network of a computer vision system or equivalent) image data associated with a grid cell of an image to determine a feature point corresponding to a position of a feature detected in the image data. The apparatus also comprises means for encoding the position of the feature with respect to a coordinate system referenced to the grid cell. The apparatus further comprises means for providing an output to represent the feature point. The output, for instance, includes one or more parameters indicating the encoded position, one or more attributes of the feature, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of providing feature detection, according to one embodiment;

DESCRIPTION OF SOME EMBODIMENTS

Examples of a method, apparatus, and computer program for providing feature point detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of providing feature detection, according to one embodiment. Feature point detection is a traditional computer vision problem to find semantic identifiers on objects in the image. In an image, feature points could be corners of a semantic object, intersection of object boundaries, or uniquely identifiable positions of sub-objects in an object. As discussed above, advances in computing power have enabled service providers to use feature detection in a growing number of applications.

Figure 2B:
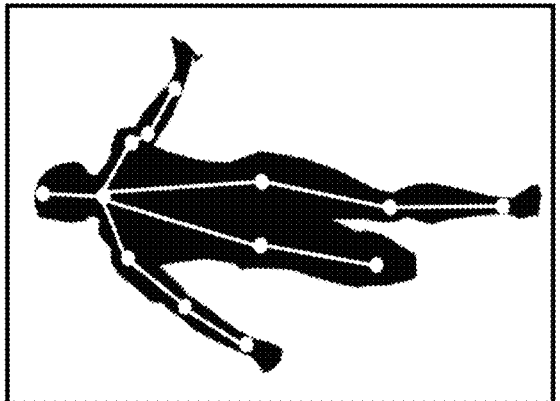
FIGS. 2A-2C are diagrams illustrating example feature detection domains, according to one embodiment.
Figure 2A:
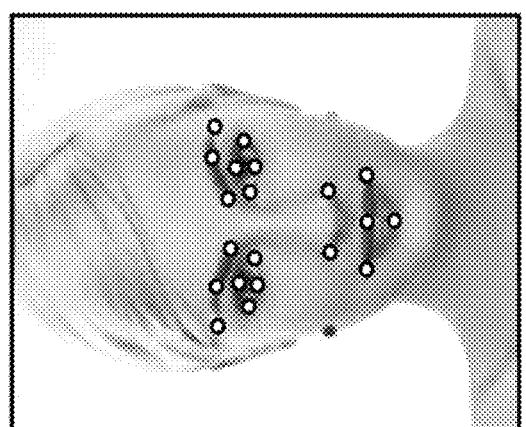

For example, some applications across different domains or uses cases can include but are not limited to:

(1) Face detection domain—As shown in image 201 of FIG. 2A, feature points (e.g., indicated by white circles) corresponding, for instance, to centers and corners of eyes, nose tip or edges on a face, centers and corners of lips, etc. could be used in face identification, face tracking, analysis of facial expressions, detection of dysmorphic facial signs for medical diagnosis, etc.

(2) Motion tracking domain—As shown in image 221 of FIG. 2B, feature points (e.g., indicated by white circles) corresponding, for instance, to joints (e.g., arm, leg, neck, etc. joints) on a human body could be utilized for human pose estimation, human motion tracking, etc.

Figure 2C:

(3) Navigation/mapping domain—As shown in image 241 of FIG. 2C, feature points (e.g., indicated by white circles) corresponding, for instance, to lane line intersections, building corners, etc. could be used as localization object identifiers, survey points to evaluate/improve the positional accuracy of the map, etc.

However, automatically and accurately detecting feature points is a challenging technical problem because of multiple reasons. Firstly, in certain situations, feature points may often not stand out in image from the background because of poor image quality, which can make it difficult for traditional computer vision techniques to detect them.

Secondly, feature point configurations could change across images. For example, features that are fiducial points on the face can change their relative position depending on the emotions. Traditional approaches such as applying template matching and basic pattern recognition to account could improve detection but would result in reduced generalization capability. Also, different kinds of feature points—for example, facial key points, human body key points and geographical feature points on the ground fall into different domains that historically have demanded different solutions from each other, requiring multiple specialized solutions making it time consuming and inefficient. In other words, facial recognition systems typically would have specialized templates, algorithms, etc. tailored to facial features that may not apply to other domains such as motion tracking, navigation/mapping, etc. As a result, service providers often must devote significant time and technological resources into developing feature detectors for each different domain.

To address these technical challenges, the system 100 of FIG. 1 introduces a technological solution to parametrically represent feature points in such a way that can easily be detected or represented by a computer vision system 101 (e.g., employing a neural network or equivalent feature detector). Compared to traditional approaches, the embodiments of the system 100 described herein do not have any constraints on the number or type of feature points, or domains that can be processed by the computer vision system 100. In contrast, domain-specific systems and experts are used to proposing different technological solutions for different application domains like facial key points, human body key points, and geographical/road feature points on the ground. The embodiments described herein eliminate the domain specificity of traditional approaches. The system 100 can also provide improved positional accuracy of detected features because it focuses on the local information around the feature points to make the prediction. The embodiments of the computer vision system 101 and other components of the system 100 are described in more detail with respect to FIGS. 3-8 below.

Figure 3:
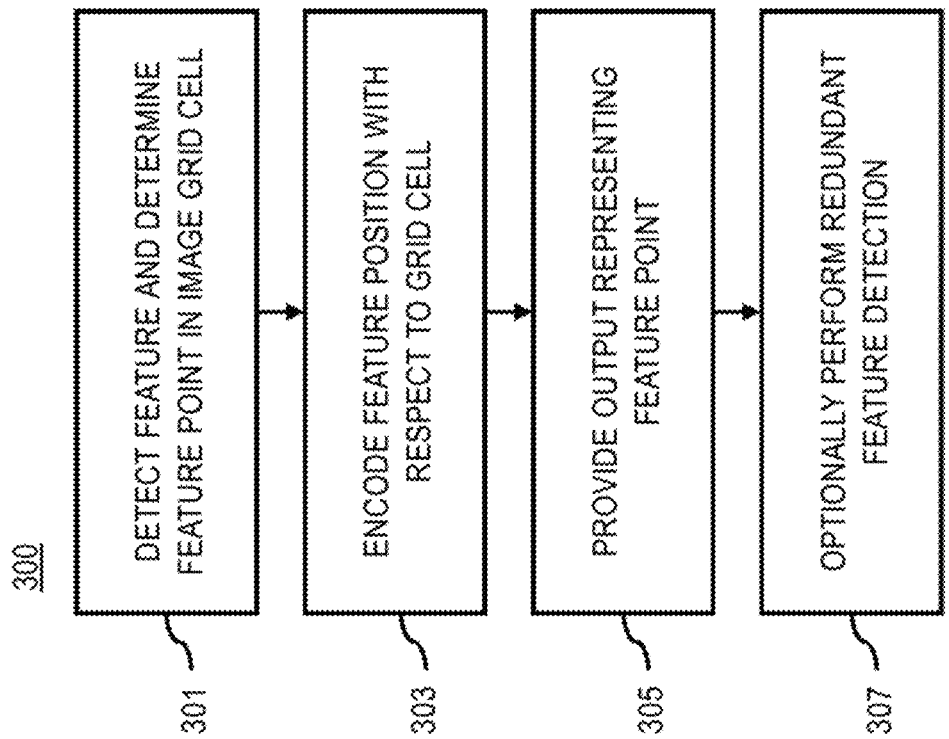
FIG. 3 is a flowchart of a process for providing feature detection, according to one embodiment.
Figure 11:
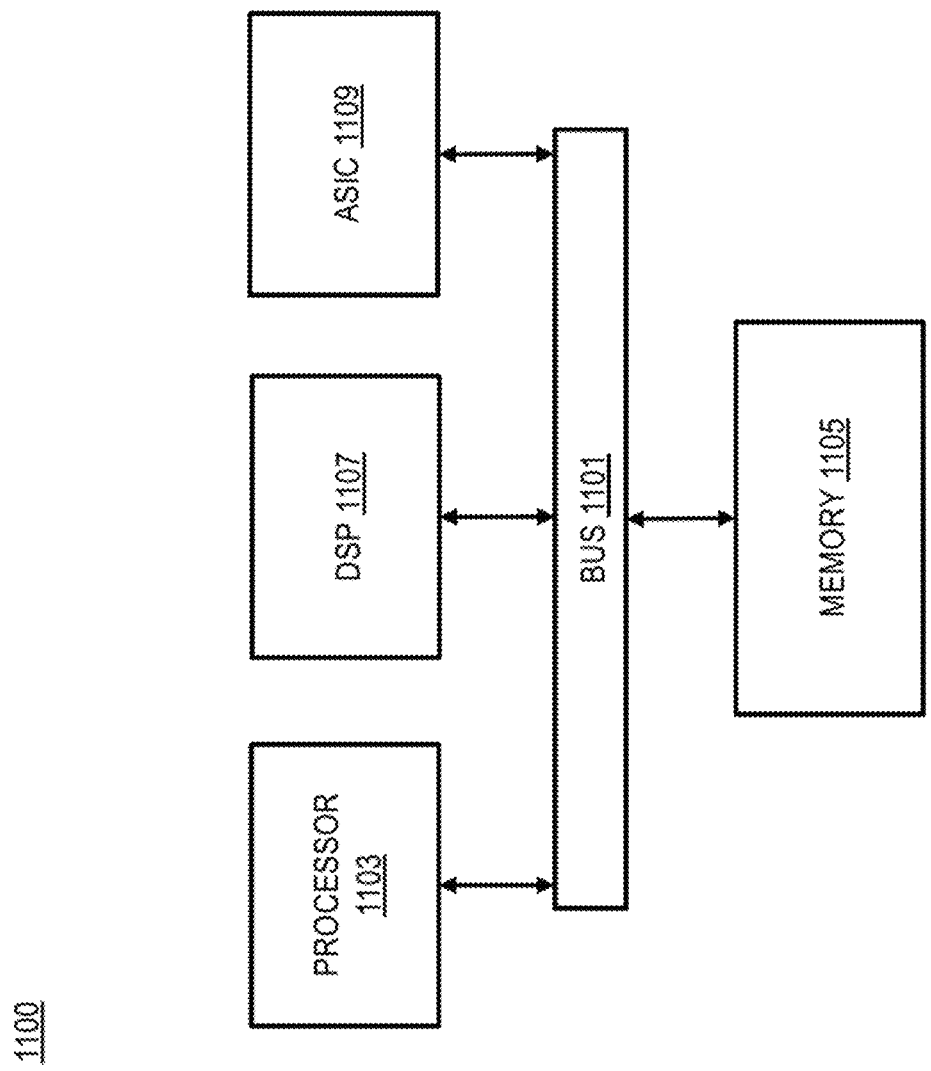
FIG. 11 is a diagram of a chip set that can be used to implement an embodiment of the invention.

FIG. 3 is a flowchart of a process for providing feature detection, according to one embodiment. In one embodiment, the computer vision system 101 may perform one or more portions of the process 300 and may be implemented in, for instance, a chip set including a processor and a memory as shown in FIG. 11. As such, the computer vision system 101 can provide means for accomplishing various parts of the process 300. In addition or alternatively, a services platform 103 and/or any of the services 105*a*-105*n* (also collectively referred to as services 105) may perform all or a portion of the steps of the process 300 in combination with the computer vision system 101 or as standalone components. Although the process 300 is illustrated and described as a sequence of steps, it is contemplated that various embodiments of the process 300 may be performed in any order or combination and need not include all of the illustrated steps.

In step 301, the computer vision system 100 processes image data associated with a grid cell of an image to determine a feature point corresponding to a position of a feature detected in the image data. In one embodiment, the input image can be captured by one or more imaging devices 107 such as but not limited to a camera 109, user equipment (UE) 111 (e.g., a mobile device, smartphone, etc.) equipped with a camera sensor and executing an imaging application 113, a vehicle 115 equipped with a camera sensor, and/or the like. The input image or images can be stored or provided to the computer vision system 101 over a communication network 117 as image data 119 (e.g., a database or data structure containing images).

Figure 4:
FIG. 4 is a diagram illustrating an example grid-cell segmentation of an image for feature detection, according to one embodiment.

In one embodiment, neural networks have shown unprecedented ability to recognize objects and/or their features in images, understand the semantic meaning of images, and segment images according to these semantic categories. In one embodiment, as shown in FIG. 4, the representation 401 of image data for processing by a neural network is based on a grid 403 of cells overlaid on the input image. Such a grid can be output by a fully convolutional neural network, which has the advantage of being computationally fast without having an excess of parameters that might lead to overfitting. For example, with respect to a neural network or other feature detection system, each of the grid cells can be processed by a different computing neuron or processing node to more efficiently employ the available neurons or nodes and distribute the computational load for processing the entire input image. In other words, in one layer of the neural network, the scope of each neuron corresponds to the extent of the input image area within each respective grid cell. Each neuron or node can make is prediction (e.g., detection of a feature point) for each individual grid cell, thereby advantageously avoiding the computational resource burden associated with having to have a fully connected layer. As a result of this segmentation, the basic unit of representation then becomes each cell of the grid, in which each detected feature point is parametrically encoded. Although the various embodiments described herein discuss a computer vision system 101 that employs a neural network (e.g., a convolutional neural network) to recognize feature points in input image data, it is contemplated that any type of computer vision system 101 using any other machine learning technique or other image processing technique can use the approaches to parametric representations of feature points as described herein.

As depicted in FIG. 4, each cell is square. However, it is contemplated that the cells can be of any shape or size. In one embodiment, each cell in the grid 403 is processed by a node of the neural network of the computer vision system 101 to detect feature points (e.g., indicated by white circles) contained in or with a proximity threshold of the corresponding cell. By way of example, neural networks such a convolutional neural networks (CNNs) are designed to exploit local information (e.g., the local image data of each grid cell) to make predictions (e.g., predict whether a feature is depicted in the image data of a grid cell, and/or predict the position of the detected feature). As a result, the computer vision system 100 fully takes advantage of the exploitation of location information to improve feature point detection since the output of every cell only focuses on the feature points inside or near the cell. By way of example, a feature point can refer to any feature in general or a feature that can be represented or identified using a point location in the image. In one embodiment, the computer vision system 101 uses the neural network to predict the point location or position of the detected feature in the portion of the image represented in the corresponding grid cell or other neighboring grid cell within a proximity threshold.

In step 303, the computer vision system 100 encodes the position of the feature with respect to a coordinate system referenced to the grid cell. For example, position information can be fully represented using x and y coordinates with respect to the cell that detects the feature. In this case, the horizontal boundary of cell can represent the x axis and the vertical boundary of the cell can represent the y axis. The coordinates, for instance, can correspond to a pixel count along each axis with one corner of the grid cell (e.g., the lower left corner) designated as coordinate (0,0). It is noted that the above coordinate system is provided by of illustration and not as a limitation. It is contemplated that any other equivalent coordinate system that is applies individually or is otherwise internally referenced to the grid cell can be used. In other words, the encoding of the position of the feature point is performed by expressing the predicted position of the detected feature using the grid cell's coordinate system (e.g., x,y coordinate system referenced to positions along the grid cell's boundaries or axes).

Figure 5:
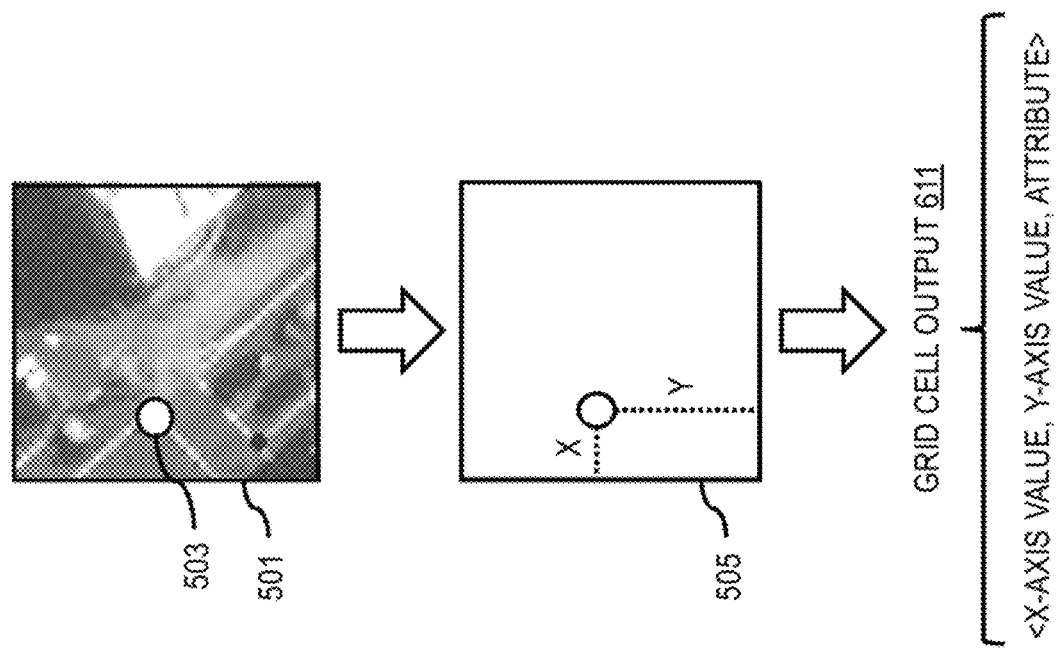
FIG. 5 is a diagram illustrating an output representation of a feature point detected in a grid cell unit, according to one embodiment.

As shown in the example of FIG. 5, for every feature point, there is associated position information and optionally attribute information, such as type (eye center, nose tip, etc. for face fiducial points). In the example of FIG. 5, the image data corresponding to the portion of an image following within a grid cell 501 is processed to detect a crosswalk intersection feature point 503. The detected feature point 503 is then encoded as a parametric representation 505 of the position (e.g., indicated by a determined x-axis value and a y-axis value that is referenced the local coordinate system of the grid cell). Thus, in one embodiment, for every feature point, there is associated position information and optionally an attribute describing the feature (e.g., feature type, domain of the feature, etc.) to generate the grid cell output 507 including the x-axis value, y-axis value, and one or more attribute values. In this example, the image recognition domain are ground features for mapping and navigation. This domain can be recorded in the attribute field of the output 507. In another use case, the computer vision system 101 can query a geographic database 121 to determine additional attributes about the detected feature (e.g., road type, neighborhood, functional class of the road, etc.).

In one embodiment, the grid cell output can include separate output channels for each parameter. For example, as discussed above, position information can be fully represented using x and y coordinates with respect to the cell/ neural network node that detects it. Two channels/dimensions are hence needed (e.g., one output channel for the x-axis parameter and another output channel for the y-axis parameter). In one embodiment, the neural network of the computer vision system 101 can also output a confidence value that indicates the probability of the existence of that feature point (which can also occupy another channel). In addition, when one or more attributes are determined for the feature point, one respective output channel for each attribute can also be generated. To sum up for a case where no confidence value is needed, for each feature point, $C_p$=1 (for x value)+1 (for y value)+# of attributes are needed for the representation, where $C_p$ is the number of channels needed.

In one embodiment, the computer vision system 101 can specify or otherwise determine a maximum or total number of features to be detected in each grid cell. In this case, the total number of channels C per cell is given by # of points per cell * $C_p$. The number of feature points to be detected for each cell can be chosen by the computer vision system 101 based on the cell size and/or density of the feature points. For example, the cell size can be determined based on the number of pixels along the x axis and y axis in the cell (e.g., larger cells have more pixels than smaller cells for a given pixel size of the image). The density of the feature points can be a known or predicted number features points that have been or is expected to be detected in the input image.

Figure 6:
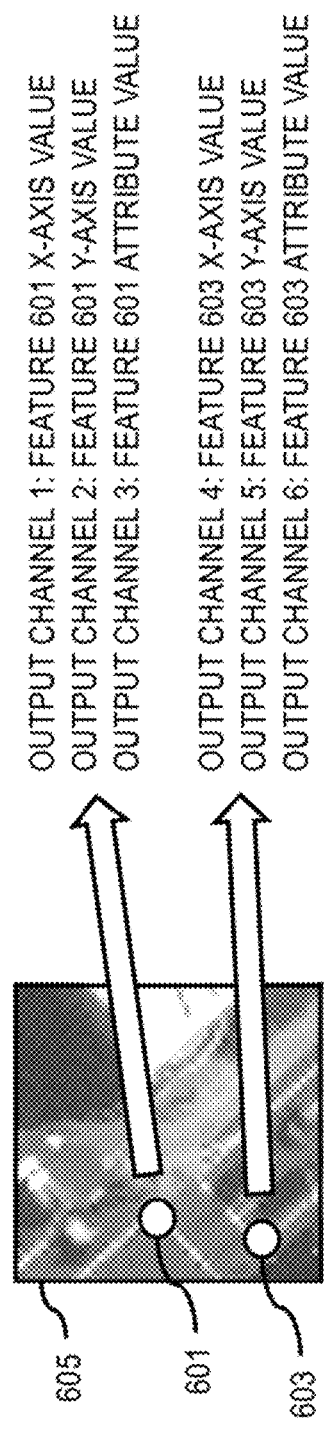
FIG. 6 is a diagram illustrating an output representation with multiple detected feature points in a grid cell, according to one embodiment.

FIG. 6 is a diagram illustrating an output representation with multiple detected feature points in a grid cell, according to one embodiment. In the example of FIG. 6 two feature points 601 and 603 are detected in a grid cell 605. Because each detected feature occupies three output channels (e.g., one channel for an x-axis value, one channel for a y-axis value, and one channel for an attribute value), the resulting grid cell output representing these two detected features occupies a total of 6 output channels (e.g., output channels 1-3 for feature point 601 and output channels 4-6 for feature point 603).

In step 305, the computer vision system 101 provides an output that includes one or more parameters indicating the encoded position of the feature and/or one or more attributes of the feature to represent the detected feature point. In one embodiment, the computer vision system 101 can provide individual outputs for each cell individually, in subgroups of the cell, or a total aggregate. When reporting the output of multiple cells at one time, the computer vision system 101 can generate the output of the neural network as a tensor, multiple dimensional array, or equivalent data structure. The tensor, array, etc., for instance, can have dimensions that is calculated as follows:

$$\text{output dimensions}=(H/\text{cell\_size\_}y)\times(W/\text{cell\_size\_}x)\times(C)$$

where:
H—height of input image (e.g., in pixels);
W—width of input image (e.g., in pixels);
cell_size_x—cell size along x axis (e.g., in pixels);
cell_size_y—cell size along y axis (e.g., in pixels); and
C—the number of channels per cell.

In one embodiment, the cell size is decided based on the density of the feature points in the images. For example, a smaller cell size can be selected when there is a higher density of features, and larger cell size can be selected when there is a lower density of features. In other words, the computer vision system 101 can determine a cell size that will result or is expected to result in a target number of features per grid cell. If there is a maximum number of output channels dedicated to each grid cell, the cell size can be determined so that the number of expected features is less likely to exceed the output channel capacity of the grid cell. For example, if there are a total of 6 output channels for each grid cell and each detected feature uses 3 channels, then the cell size can be selected to target an expected density of 2 features per grid cell. In addition or alternatively, the dimensions of the output tensor, multidimensional array, etc. can be based on the size of the image, available computing resources (e.g., processing power, bandwidth, memory, etc.), user preferences, domain type, application requirements, etc.

Figure 7:
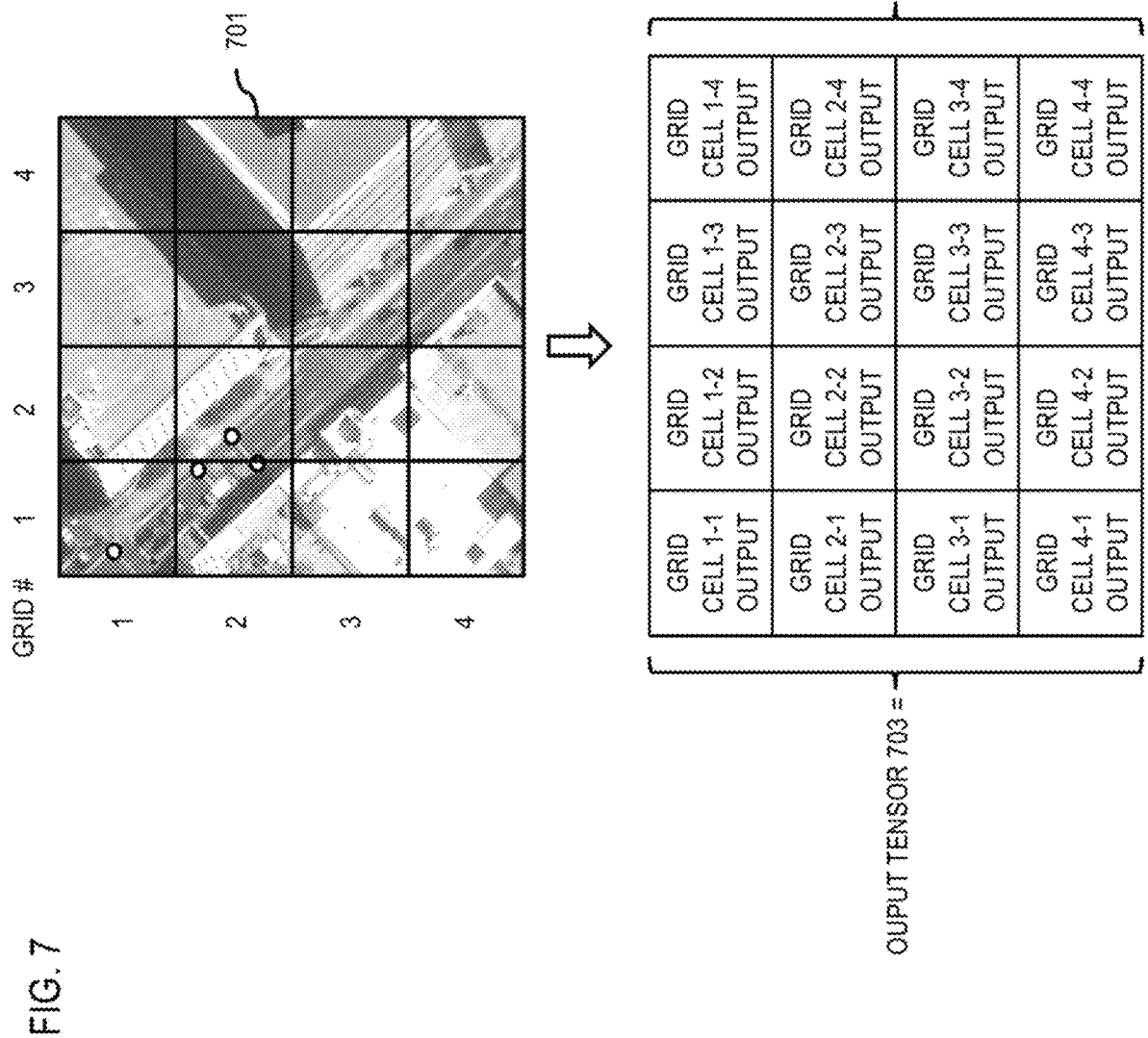
FIG. 7 is a diagram illustrating a tensor output that aggregates the feature detection outputs of the grid cells of an image, according to one embodiment.

As shown in the example of FIG. 7, an input image 701 is segmented into 16 grid cells according to a 4×4 grid. Each of the 16 grid cells can be processed by a node of a neural network of the computer vision system 101 to detect feature points in a parametric representation based on local coordinates according to the embodiments described herein. The individual grid cell outputs (e.g., the 16 grid cell outputs numbered from 1-1 through 4-4) can then be aggregated to populate the output tensor 703 or equivalent data structure. In one embodiment, this output tensor 703, individual grid cell outputs, and/or related data can be stored in the features database 123 or equivalent for access by applications or services using the detected feature points. For example, the services platform 103 and/or services 105 can use the detect feature points for facial recognition, motion tracking, mapping/navigation, etc.

In optional step 307, the computer vision system 101 can optionally provide for feature detection redundancy in the generated output. In one embodiment, the computer vision system 100 can use a neighboring node or cell of the neural network to process the same image data corresponding to grid cell of interest to detect the same feature. In other words, redundancy can be provided by allowing not just the cell—that contains the feature point—but also the neighboring cells or nodes to make the prediction of the feature point. In one embodiment, a threshold distance or proximity threshold can be set to choose the extent of the neighboring cells that are allowed to make the prediction.

Figure 8:
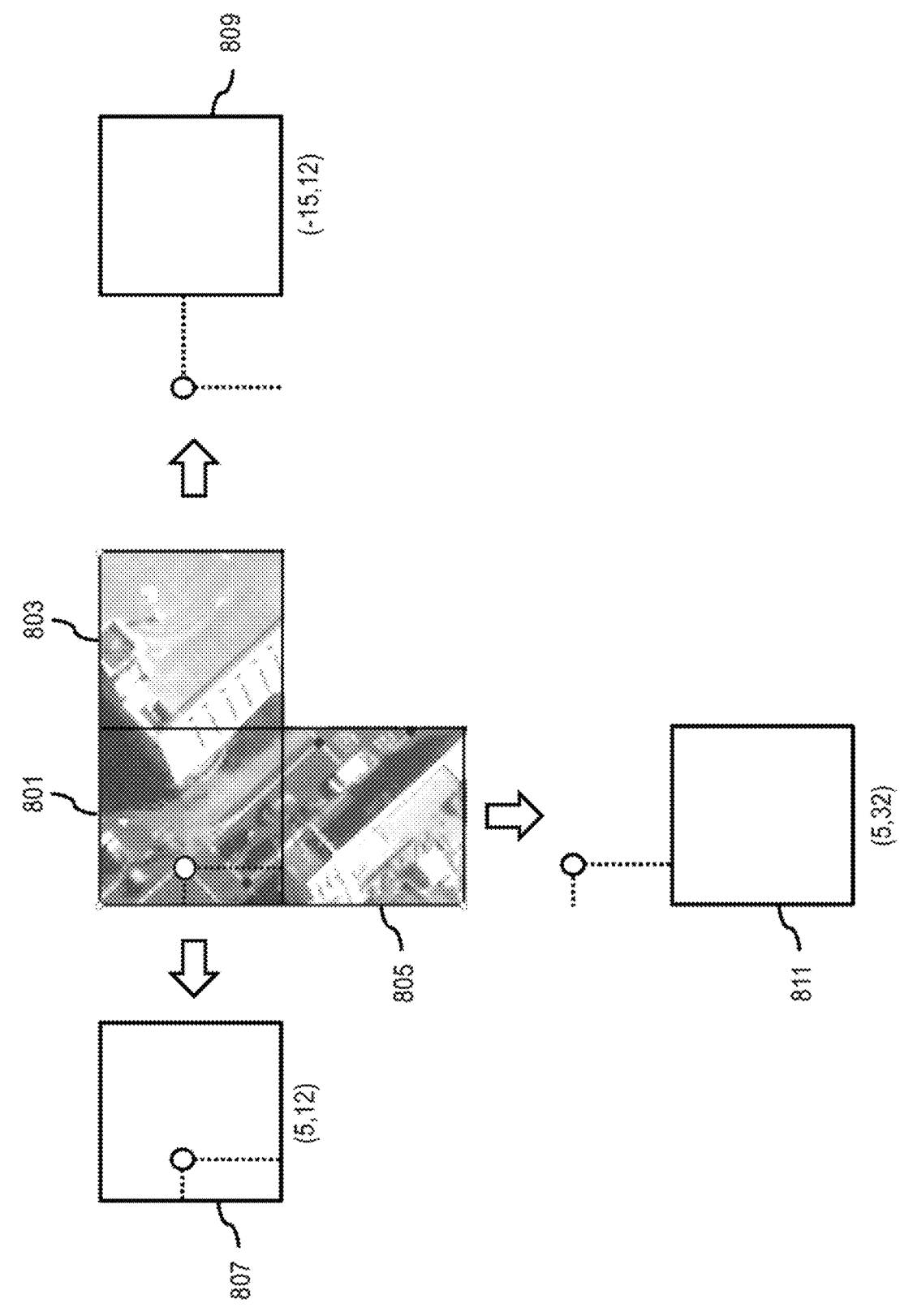
FIG. 8 is a diagram illustrating a process for generating redundant output for a detected feature point, according to one embodiment.

FIG. 8 is a diagram illustrating a process for generating redundant output for a detected feature point, according to one embodiment. In the example of FIG. 8, a feature point is detected in cell 801 of an image. The proximity threshold for redundant representation has been set to a distance of one cell along an edge of the cell 801 containing the feature point. Accordingly, the neural network nodes of cells 803 and 805 can also process the image data contained with the cell 801 to make redundant detections of feature point in cell 801. This, in turn, results in three redundant outputs of the feature point in cell 801: (1) output 807 generated by cell 801, (2) output 809 generated by cell 809, and (3) output 811 generated by cell 805. In this example, each cell 801-805 represents a 20×20 pixel portion of the input image. Based on this cell size, for each grid cell, the computer vision system 101 creates a local coordinate system using pixels as the coordinate unit. For example, the lower left corner of the grid cell being (0, 0), with the x-axis extending horizontally and the y-axis extending vertically from the lower left corner. It is noted that this coordinate system is provided by way of illustration and not as a limitation.

Based on their respective local coordinate system, each of the cells 801-805 provides a predicted position of the feature point in cell 801. For example, the predicted coordinates of the feature point in output 807 (cell 801's output) is (5, 12) with respect to local coordinates of cell 801. The predicted coordinates of the feature point in output 809 (cell 803's output) is (−15,12) with respect to the local coordinates of cell 803, which indicates that the detected feature point is located 15 pixels outside of the left boundary of the grid cell 803 (e.g., placing the feature point correctly in cell 801). The predicted coordinates of the feature point in output 811 (cell 805's output) is (5, 32) with respect to the local coordinates of cell 805, which indicates that the feature point is located 12 pixels outside the top boundary of the grid cell 805 (e.g., placing the feature point correctly in cell 801).

In one embodiment, the computer vision system 100 can use the redundant detections of the same feature to improve the predicted feature position. For example, the redundant outputs can be used to eliminate outliers, determine means/medians/other statistics, etc.

The embodiments of the parametric representation of detected feature points described herein are also flexible enough to accommodate different configurations and numbers of feature points in the image. This is facilitated by the cell centric but not image level parametrization.

In addition, the embodiments of the parametric representation are not domain-specific. The system 100 need only to change the training data set depending on the feature points that are to be detected. For example, the cell-based parametric representation can be used to represent feature points corresponding to facial recognition, motion tracking, navigation/mapping, etc. regardless of the domain. This allows ground truth training data sets to be created using same the domain-agnostic parametric representation of the embodiments regardless of the domain.

Returning to FIG. 1, as shown, the system 100 includes a computer vision system 101 configured to perform the functions associated with feature point detection according to the various embodiments described herein. In one embodiment, the computer vision system 101 includes a neural network or other machine learning/parallel processing system to automatically detect features in image data. In one embodiment, the feature point detection can be used to support any number of services or applications. For example, within the navigation/mapping domain, feature point detection can be used to support localization of, e.g., a vehicle 115 within the sensed environment. In one embodiment, the neural network of the computer vision system 101 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the computer vision system 101 also has connectivity or access to a geographic database 121 which contain representations of mapped geographic features to facilitate determining attributes of mapping/navigation related features. The geographic database 121 or equivalent domain-specific database can also store parametric representations of detect feature points and/or related data generated or used to encode or decode parametric representations of feature points according to the various embodiments described herein.

In one embodiment, the computer vision system 101 has connectivity over a communication network 117 to a services platform 103 that provides one or more services 105. By way of example, the services 105 may be third party services and include facial recognition, motion tracking, mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 105 uses the output of the computer vision system 101 (e.g., parametric representations of feature points) to provide the services 105.

In one embodiment, the computer vision system 101 may be a platform with multiple interconnected components. The computer vision system 101 may include multiple servers, intelligent networking devices, computing devices, components and corresponding software for providing parametric representations of lane lines. In addition, it is noted that the computer vision system 101 may be a separate entity of the system 100, a part of the one or more services 105, a part of the services platform 103, or included within the imaging devices 107.

In one embodiment, content providers 125a-125m (collectively referred to as content providers 125) may provide content or data (e.g., including geographic data, parametric representations of mapped features, etc.) to the geographic database 121, the computer vision system 101, the services platform 103, the services 105, and/or imaging devices 107. The content provided may be any type of content, such as map content, textual content, audio content, video content, image content, etc. In one embodiment, the content providers 125 may provide content that may aid in the detecting and classifying of features in image data. In one embodiment, the content providers 125 may also store content associated with the geographic database 121, computer vision system 101, services platform 103, services 105, and/or imaging devices 107. In another embodiment, the content providers 125 may manage access to a central repository of data, and offer a consistent, standard interface to data, such as a repository of image data, detected features data. Any known or still developing methods, techniques or processes for retrieving and/or accessing image data, feature data, etc. from one or more sources may be employed by the computer vision system 101.

In one embodiment, the imaging devices 107 may execute a software application 113 to collect, encode, and/or decode lane line detected in image data into the parametric representations according the embodiments described herein. By way of example, the application 113 may also be any type of application that is executable on the imaging devices 107, such as facial recognition applications, motion tracking applications, mapping applications, location-based service applications, navigation applications, content provisioning services, camera/imaging application, media player applications, social networking applications, calendar applications, and the like. In one embodiment, the application 113 may act as a client for the computer vision system 101 and perform one or more functions of the computer vision system 101 alone or in combination with the computer vision system 101.

By way of example, the imaging devices 107 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the imaging devices 107 can support any type of interface to the user (such as "wearable" circuitry, etc.).

In one embodiment, the imaging devices 107 are configured with various sensors for generating or collecting image data (e.g., for processing the computer vision system 101), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the imaging devices 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 111 and/or vehicle 115 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the imaging devices 107 may include GPS or other satellite-based receivers to obtain geographic coordinates from satellites for determining current location and time. Further, the location can be determined by a triangulation system such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the geographic database 121, computer vision system 101, services platform 103, services 105, imaging devices 107, and/or content providers 125 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
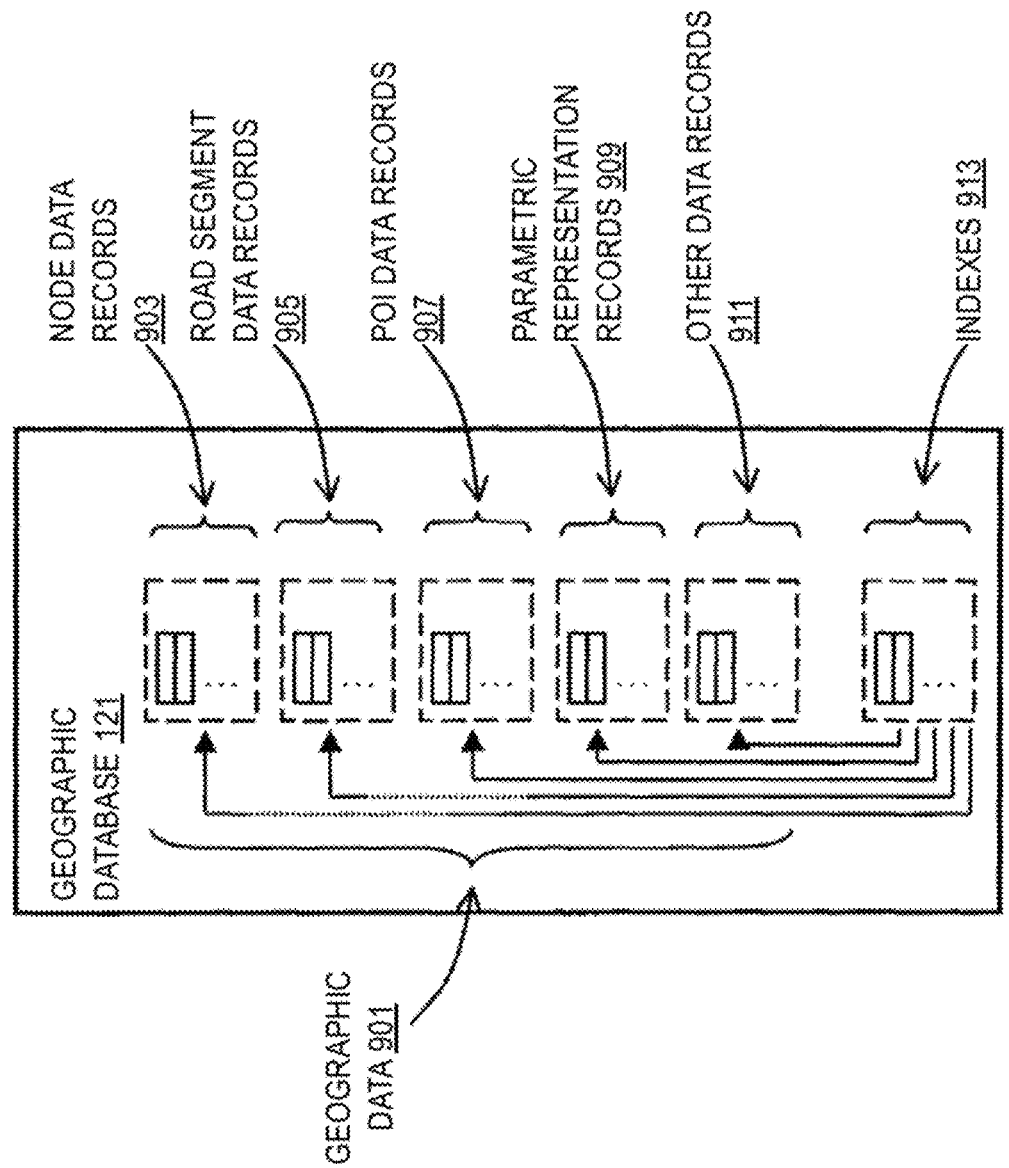
FIG. 9 is a diagram of a geographic database for providing feature detection attributes, according to one embodiment.

FIG. 9 is a diagram of a geographic database or equivalent domain-specific database for providing feature detection attributes, according to one embodiment. In one embodiment, the geographic database 121 includes geographic data 901 used for (or configured to be compiled to be used for) mapping and/or navigation-related services, such as for video odometry based on the parametric representation of lanes include, e.g., encoding and/or decoding parametric representations of feature points with respect to geographic features. It is noted that geographic features are provided to illustrate on example of domain-specific attributes for feature detection, and it is contemplated that an equivalent database can be used for other domains such as but not limited to facial recognition, motion tracking, etc. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 903, road segment or link data records 905, POI data records 907, parametric representation records 909, other records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 121. In one embodiment, the indexes 913 may be used to quickly locate data without having to search every row in the geographic database 121 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 907. The geographic database 121 can also include data about places, such as cities, towns, or other communities, and other geographic features, such as bodies of water, mountain ranges, etc. Such place or feature data can be part of the POI data records 307 or can be associated with POIs or POI data records 907 (such as a data point used for displaying or representing a position of a city).

In one embodiment, the geographic database 121 can also include parametric representations records 909 for storing parametric representations of the feature points detected from input image data according to the various embodiments described herein. In one embodiment, the parametric representation records 909 can be associated with one or more of the node records 1103, road segment records 1105, and/or POI data records 907 to support localization or video odometry based on the features stored therein and the generated parametric representations of features points of the records 909. In this way, the parametric representation records 909 can also be associated with the characteristics or metadata of the corresponding record 1103, 1105, and/or 1107.

In one embodiment, the geographic database 121 can be maintained by the content provider 125 in association with the services platform 103 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle (e.g., vehicle 115 and/or UE 111) along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 115 or UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing feature point detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
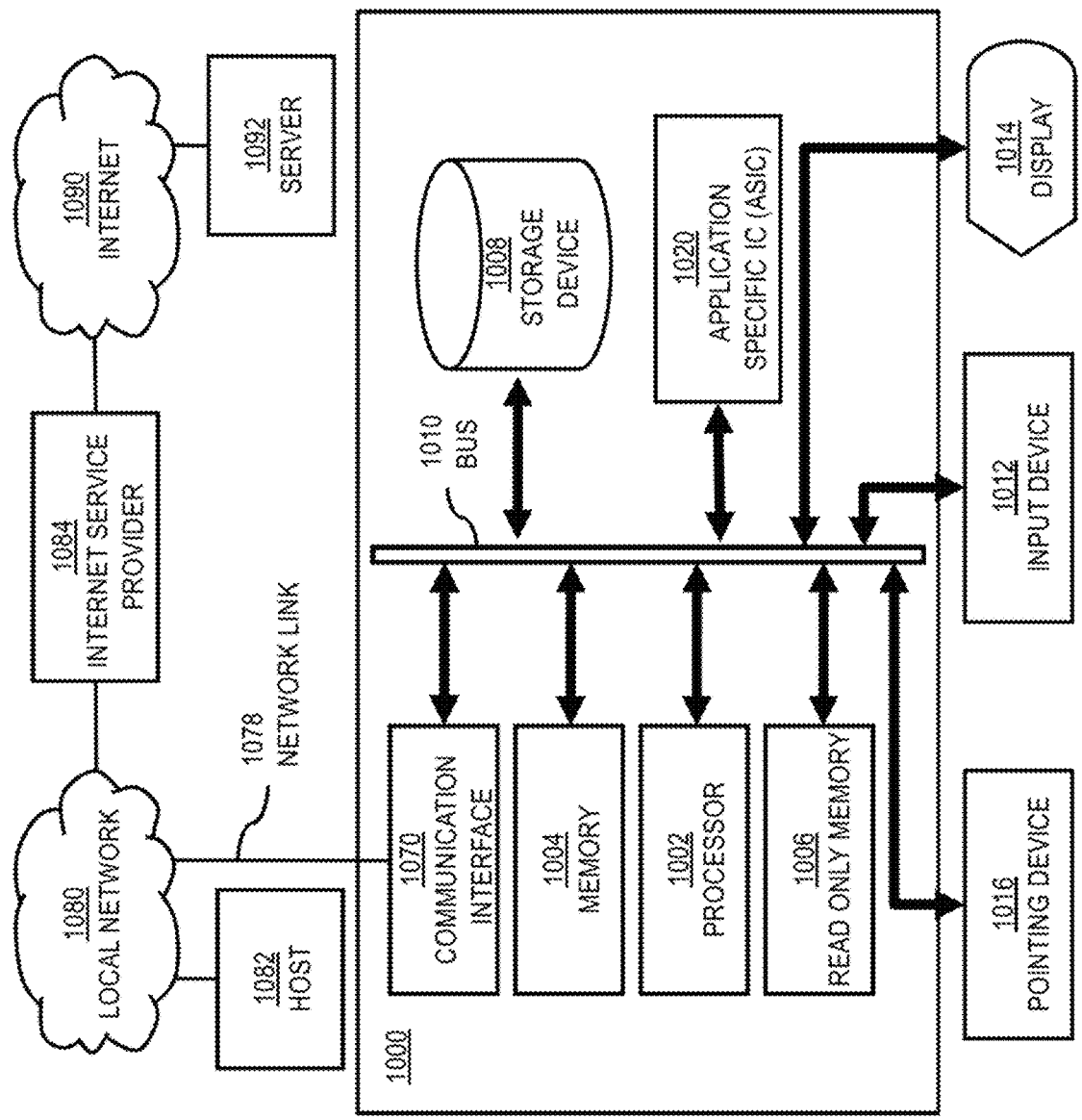
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide feature point detection as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing feature point detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing feature point detection. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing feature point detection, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 117 for providing feature point detection.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide feature point detection as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide feature point detection. The memory 1105 also stores the data associated with or generated by the execution of the inventive steps.

Figure 12:
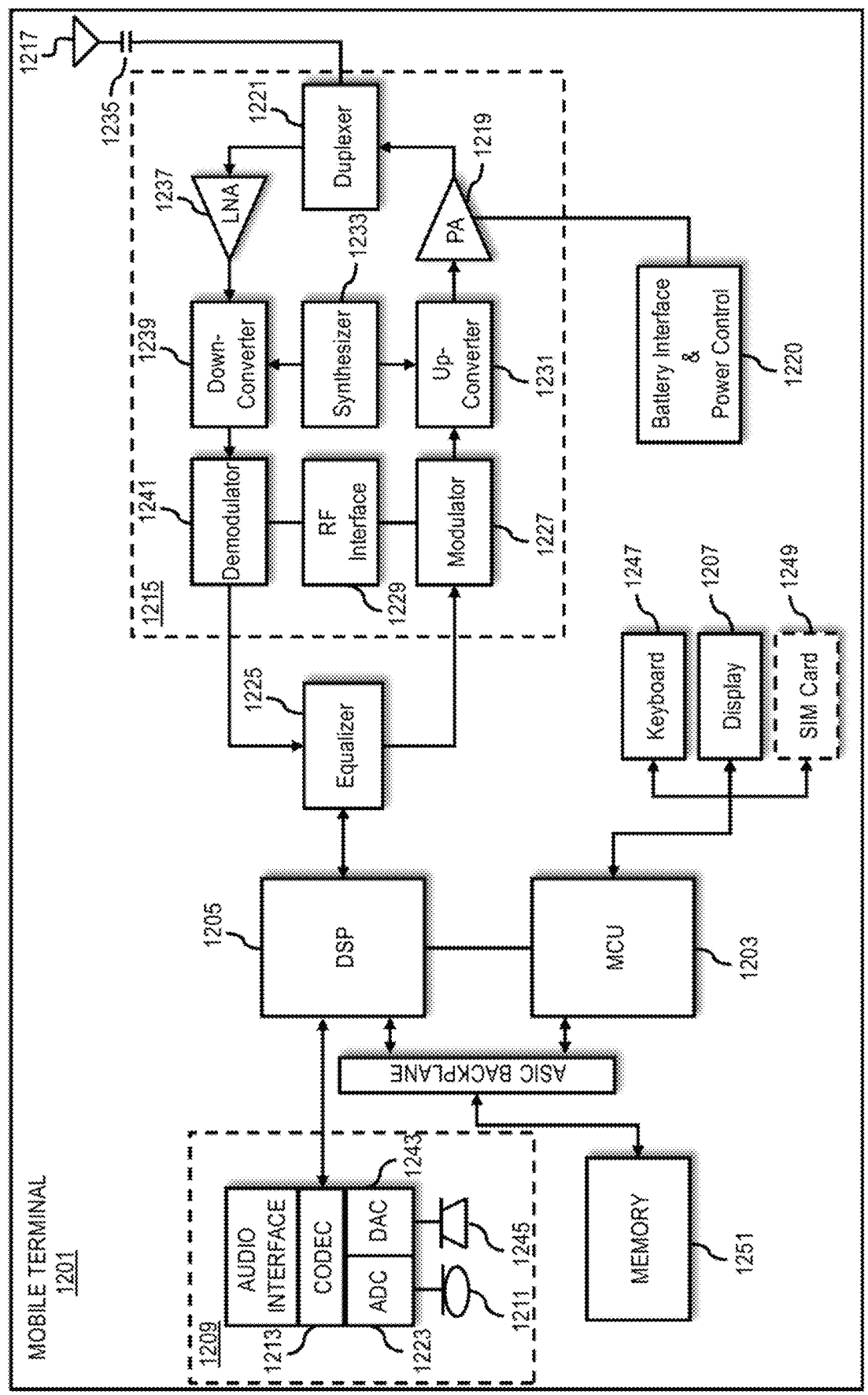
FIG. 12 is a diagram of a mobile terminal (e.g., handset) that can be used to implement an embodiment of the invention.

FIG. 12 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide feature point detection. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing image data associated with a grid cell of an image to determine at least one feature point corresponding to a feature detected in the image;
    parametrically encoding a position of the at least one feature point with respect to a coordinate system referenced to the grid cell; and
    providing an output to represent the at least one feature point,
    wherein the output includes one or more parameters indicating an encoded position of the at least one feature point, one or more attributes of the feature, or a combination thereof.

2. The method of claim 1, wherein the output includes a respective output channel for the encoded location, the one or more attributes, or a combination thereof.

3. The method of claim 2, wherein the output is a tensor with dimensions based on an image size of the image, a cell size of the grid cell, and a total number of the respective output channels.

4. The method of claim 3, wherein the grid size is based on a density of feature points in the image.

5. The method of claim 3, wherein the total number of the respective output channels is further based on a number of feature points per grid cell.

6. The method of claim 5, wherein the number of feature points per grid cell is based on the grid size and the density of feature points.

7. The method of claim 1, wherein the processing of the image data in the grid cell is performed using a node of a neural network.

8. The method of claim 7, wherein a neighboring node of the neural network processes the image data to detect the feature and generate a redundant output to represent the feature point.

9. The method of claim 1, wherein the coordinate system includes an x-axis corresponding to a horizontal width of the grid cell and a y-axis corresponding to a vertical height of the grid cell.

10. The method of claim 1, wherein the one or more attributes include a domain of the feature detected in the image.

11. An apparatus comprising:
at least one processor; and
at least one memory including computer program code for one or more programs,
the at least one memory and the computer program code configured to, with the at least one processor, cause the apparatus to perform at least the following,
segment an input image into a plurality of grid cells;
process image data associated with a grid cell of an image to determine at least one feature point corresponding to a feature detected in the image;
parametrically encode a position of the at least one feature point with respect to a coordinate system referenced to the grid cell; and
provide an output to represent the at least one feature point,
wherein the output includes one or more parameters indicating an encoded position of the at least one feature point, one or more attributes of the feature, or a combination thereof.

12. The apparatus of claim 11, wherein the output is a tensor with dimensions based on an image size of the image, a grid size of the grid cell, and a total number of output channels.

13. The apparatus of claim 11, wherein the processing of the image data in the grid cell is performed using a node of a neural network.

14. The apparatus of claim 13, wherein a neighboring node of the neural network processes the image data to detect the feature and generate a redundant output to represent the feature point.

15. The apparatus of claim 11, wherein the coordinate system includes an x-axis corresponding to a horizontal width of the grid cell and a y-axis corresponding to a vertical height of the grid cell.

16. A non-transitory computer-readable storage medium, carrying one or more sequences of one or more instructions which, when executed by one or more processors, cause an apparatus to perform:
processing image data associated with a grid cell of an image to determine at least one feature point corresponding to a feature detected in the image;
parametrically encoding a position of the at least one feature point with respect to a coordinate system referenced to the grid cell; and
providing an output to represent the at least one feature point,
wherein the output includes one or more parameters indicating an encoded position of the at least one feature point, one or more attributes of the feature, or a combination thereof.

17. The non-transitory computer-readable storage medium of claim 16, wherein the output includes a respective output channel for the encoded location, the one or more attributes, or a combination thereof.

18. The non-transitory computer-readable storage medium of claim 17, wherein the output is a tensor with a dimension based on an image size of the image, a cell size of the grid cell, and a total number of the respective output channels.

19. The non-transitory computer-readable storage medium of claim 18, wherein the grid size is based on a density of feature points in the image.

20. The non-transitory computer-readable storage medium of claim 18, wherein the total number of the respective output channels is further based on a number of feature points per grid cell.

* * * * *